Nov. 23, 1965 D. L. RICHTER ETAL Re. 25,914

TRAILER CONSTRUCTION

Original Filed Feb. 13, 1957 11 Sheets-Sheet 1

INVENTORS
DONALD L. RICHTER
ROBERT J. BERAN
J. S. BERULDSEN

James E. Toomey
ATTORNEY

TRAILER CONSTRUCTION

Original Filed Feb. 13, 1957 11 Sheets-Sheet 2

INVENTORS
DONALD L. RICHTER
ROBERT J. BERAN
J. S. BERULDSEN

BY James E. Toomey
ATTORNEY

TRAILER CONSTRUCTION

Original Filed Feb. 13, 1957 11 Sheets-Sheet 3

INVENTORS
D. L. RICHTER
R. J. BERAN
J. S. BERULDSEN

BY James E. Toomey
ATTORNEY

TRAILER CONSTRUCTION

Original Filed Feb. 13, 1957 11 Sheets-Sheet 4

INVENTORS
D. L. RICHTER
R. J. BERAN
J. S. BERULDSEN

James E. Toomey
ATTORNEY

TRAILER CONSTRUCTION

Original Filed Feb. 13, 1957 11 Sheets-Sheet 5

INVENTORS
D. L. RICHTER
R. J. BERAN
J. S. BERULDSEN
BY James E. Toomey
ATTORNEY

Nov. 23, 1965 D. L. RICHTER ETAL Re. 25,914

TRAILER CONSTRUCTION

Original Filed Feb. 13, 1957

11 Sheets-Sheet 6

INVENTORS
D. L. RICHTER
R. J. BERAN
J. S. BERULDSEN

BY James E. Toomey
ATTORNEY

TRAILER CONSTRUCTION

Original Filed Feb. 13, 1957 11 Sheets-Sheet 7

INVENTORS
DONALD L. RICHTER
ROBERT J. BERAN
J. S. BERULDSEN

BY James E. Toomey
ATTORNEY

TRAILER CONSTRUCTION

Original Filed Feb. 13, 1957 11 Sheets-Sheet 8

INVENTORS
D. L. RICHTER
R. J. BERAN
J. S. BERULDSEN

BY James E. Toomey
ATTORNEY

TRAILER CONSTRUCTION

Original Filed Feb. 13, 1957 11 Sheets-Sheet 9

INVENTORS
D. L. RICHTER
R. J. BERAN
J. S. BERULDSEN

BY James E. Toomey
ATTORNEY

TRAILER CONSTRUCTION

Original Filed Feb. 13, 1957 11 Sheets-Sheet 10

INVENTORS
D.L. RICHTER
R.J. BERAN
J.S. BERULDSEN
James E. Toomey
ATTORNEY

INVENTORS
DONALD L. RICHTER
ROBERT J. BERAN
J. S. BERULDSEN

BY James E. Toomey
ATTORNEY

United States Patent Office

Re. 25,914
Reissued Nov. 23, 1965

25,914
TRAILER CONSTRUCTION

Donald L. Richter, Torrance, Calif., and Robert J. Beran, Glen Ellyn, and Jacob S. Beruldsen, Northfield, Ill., assignors to Kaiser Aluminum & Chemical Corporation, Oakland, Calif., a corporation of Delaware Original No. 2,993,728, dated July 25, 1961, Ser. No. 640,004, Feb. 13, 1957. Application for reissue July 25, 1963, Ser. No. 298,005
9 Claims. (Cl. 296—28)

Matter enclosed in heavy brackets [ ] appears in the original patent but forms no part of this reissue specification; matter printed in italics indicates the additions made by reissue.

This invention relates to vehicles of the cargo carrying type. More particularly, the invention relates to cargo carrying vehicles of the closed or van type wherein a prime mover or tractor is connected thereto by an articulated joint arrangement. An excellent example of the type of vehicle with which the features of the instant invention may be advantageously used is in the tractor-semi-trailer combination appearing as commonplace on the nation's highways and used extensively for the hauling of all types and varieties of cargo. Such combinations are known in the industry as "rigs" while the actual cargo carrying portion of the vehicle in contradistinction to the "tractor" or prime mover is known as a "box."

It will be appreciated that significant improvements have been made in "rigs" in that tremendous strides have been made in the improvement of the prime mover or tractor enabling the vehicles to attain highway speeds believed impossible only a few years ago. Engines, brakes suspension systems of the tractors have been under constant evolution in their development while, unfortunately, only in recent years has attention been paid to the cargo carrying portion or "box" both as to construction details and suspension units. Consequently, the rated hauling capacity of tractors has been increased far above that which is practical because of the fact that most states impose gross weight limitations on the combined vehicle. Such gross weight would be weights of the vehicle including not only the weight of the vehicle itself or tare weight coupled with all the necessities of travel such as gas, oil, water and the like but also the weight of the actual cargo carrying portion of the vehicle including the cargo that may be carried therein. Consequently, any reduction in the basic or tare weight of the combined vehicles, assuming that the gross weight limitations remained constant, in effect permits the carrying of increased cargo weight which in turn means greater efficiency in operation. At the same time, there is no contribution of the vehicle to highway destruction and the like by reason of the fact that such increased cargo is carried.

Also most states have statutes relating to the load distribution, that is, the states fix the maximum limits of the gross load which must be distributed to the wheels of the vehicle, for example, a statute may fix a 42, 42 and 16% where a tandem axle tractor is used or a 55, 30, 15% relationship as being the weight distribution that may be permissibly carried by a vehicle of particular gross weight limitations. In other words, where the tractor has tandem rear axles, the front wheels of the tractor would carry 16% of the gross load, the rear wheels of the tractor 42% of the gross load and the rear wheels of the semi-trailer or "box" would carry 42% of the gross load. Such limitations are imposed not only to prevent a more rapid deterioration of the nation's highways which in many cases were and are not at present designed to withstand the ceaseless pounding of heavy laden vehicles day after day but also to assure safety in that tires, brakes, etc., will be properly able to withstand the service loads imposed on them. Thus, it is quite obvious that limitations on gross loads impose limitations affecting the capacity of the vehicle to carry a given weight of cargo. Several factors flow from this condition, namely present day tractors are often operated at under-capacity loads, or, the wheels and tires may be overloaded, as a result of which the efficiency of the hauling vehicle is reduced to a considerable extent. Also of interest and consideration is the fact that the load distribution limits may vary from state to state. That is to say, what may be legal in one state may be considered illegal in the next state. Since such vehicles are on the constant move and are traveling cross-country, North and South and must pass from state to state it becomes apparent that once loaded, the weight distribution must be such that compliance with the statutes of every state through which the vehicle may pass must be complied with. In other words, a vehicle or rig traveling from Washington, D.C. to Boston would pass through several states, Maryland, Delaware, New Jersey, New York, Rhode Island, Connecticut, Massachusetts. Each of these states has its own statutory limitations as to proper weight distribution. Thus, a vehicle would have to be loaded in Washington in such a manner as to conform, if possible, to the distributions which are specified as legal by each of these states and in some instances may be forced to travel partially loaded in order that the cargo may be shifted to accommodate the various statutory varied limitations. Needless to say, the partially loaded condition contributes to inefficiency. In addition, the loss of time necessitated by shifting of cargo in passing from one state to another contributes materially to the cost of transporting of the cargo and [aslo] *also* lengthens the time for travel from place to place.

The only alternative is that the vehicle may be loaded and driven from one place to another and may often times be in violation of the statutory limitations imposed by some or perhaps all of the areas thru which it travels with accompanying penalties occurring to the operator. All of these factors contribute materially not only to the expense of hauling and hence expenses to the ultimate consumer but are a constant problem and headache to the nation's freight lines and individual tractor-trailer-operators.

Accordingly, the instant invention deals directly with the problem presented in that it provided a cargo carrying "box" or van type of semi-trailer vehicle, wherein the structural components are formed of a light metal such as aluminum and where the vehicular construction is such as to enable the advantageous use of superior techniques of construction such that the light metal such as aluminum or the like may be used to its greatest extent. The invention also provides for the use of a unique suspension system as a feature thereof. Provision is thus made for a reduction in the tare or gross weight of the vehicle and further for the easy distribution of the load carried by the individual wheels of the vehicle while at the same time maximum loading of the vehicle may be effected at all times.

Accordingly, an object of the invention is to produce a large volume spacious cargo carrying van.

A further object of the invention is to produce a cargo carrying vehicle wherein light metals such as aluminum may be advantageously used.

Still another object of the instant invention is to produce a cargo carrying vehicle wherein modern fabrication techniques may be utilized to the utmost.

Still a further object of the invention is to produce a vehicle which may include an adjustable weight distribution medium.

Another object of the invention is to produce a vehicle incorporating an advanced monocoque, frameless construction, which is exceptionally strong.

A further object of the invention is to produce a vehicle which is pleasing in appearance and in which maintenance costs are reduced to a minimum.

Still a further object of the invention is to produce a vehicle which is rustproof and requires little or no painting.

Another object of the invention is to produce a cargo carrying vehicle which is light and which employs the use of compact components, reliance being had to a great extent on the use of extruded light metal sections.

Still another object of the invention is to produce a vehicle which may be readily repaired and which may incorporate construction features having sufficient strength to support any cargo which may be carried therein.

These and other objects of the present invention not specifically referred to above but inherent are accomplished by fabricating the vehicle or "box" of longitudinally extending light metal beams which are coupled with a plurality of so-called "honey-comb" type of floor panels, the whole comprising a load supporting and load transfer structure conspicuous by the absence of a heavy under-frame or chassis as is conventional in the art. In addition, suitable cast, sheet and extruded components are used in the unique construction of front, sides, doors, landing gear, fifth wheel transition section and the unique suspension unit whereby the entire structure may be highly effective in the production of a cargo-carrying vehicle having a maximum of unobstructed cargo-carrying space, a minimum of weight, and also providing for variation of the load distribution such that a maximum compliance with state statutes may be effected while a maximum load is carried in the vehicle.

Having considered the foregoing objects and broad statements of the invention, attention is directed to the attached drawings, which when taken in conjunction with the following detailed description are illustrative of the inventive concepts, and from which the instant invention may be understood. In the attached drawings:

FIGURE 6 is a vertical sectional view taken along the line 6—6 of FIGURE 4;

FIGURE 16 is a top plan view of the complete tandem wheel carriage, with the exception of springing details as attached to the vehicle, parts of the floor being broken away for clarity;

In connection with the following detailed description of the invention, it will be appreciated that similar parts are used since the vehicle is symmetrical about its longitudinal center-line and hence a description of one side will suffice for the other.

Figure 1:
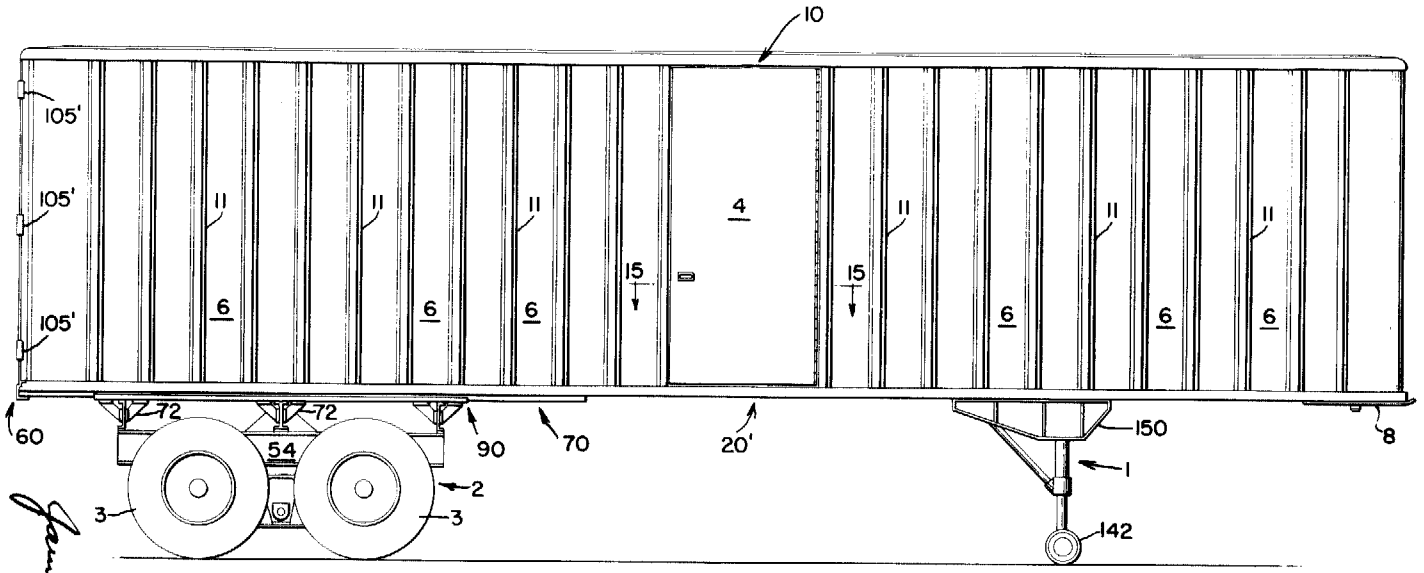
FIGURE 1 is a side elevational view of a semitrailer vehicle illustrating the essential features of the instant invention.
Figure 3:
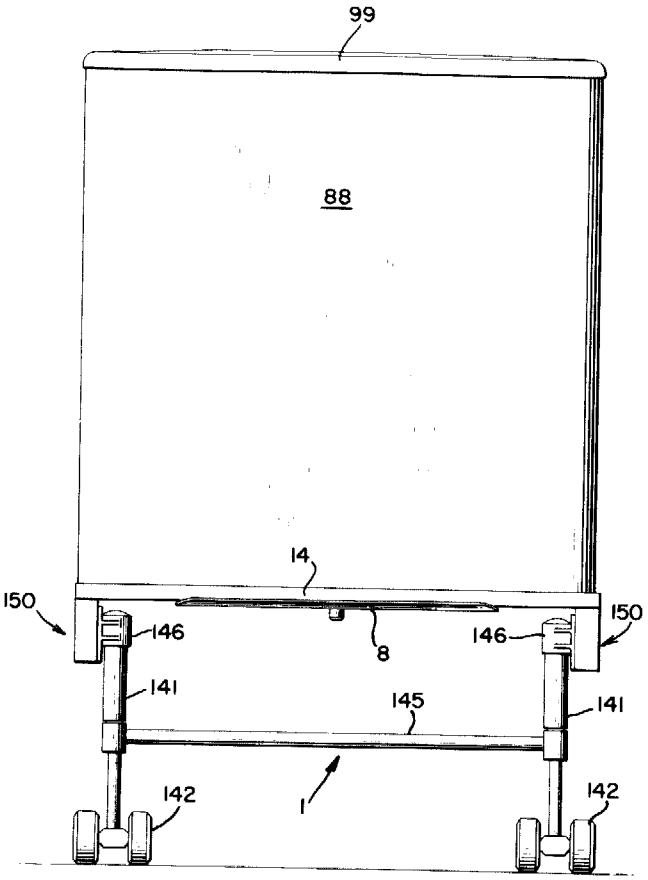
FIGURE 3 is a front elevation of the complete vehicle disclosed in FIGURES 1 and 2.
Figure 2:
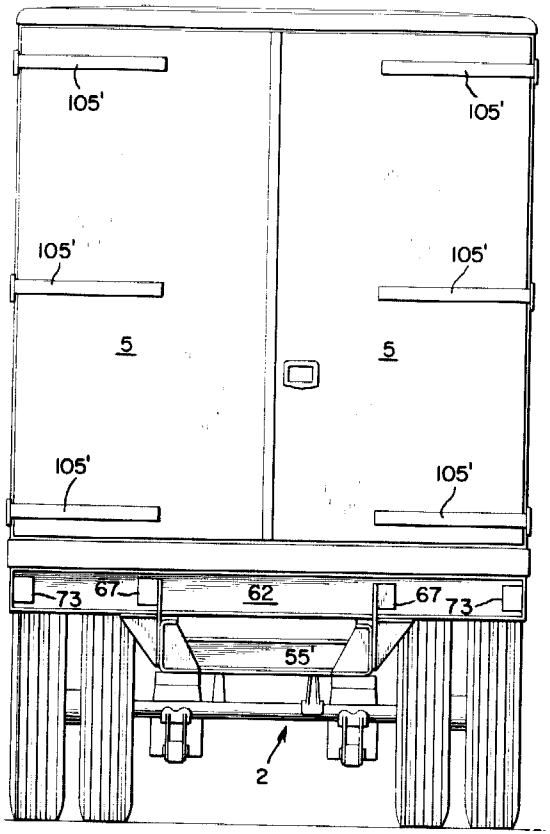
FIGURE 2 is a rear elevation of the vehicle disclosed in FIGURE 1.

Accordingly, referring now to FIGURES 1, 2 and 3, it may be seen that the vehicle is comprised generally of a generally box-shaped cargo carrying section including a lower side or rub rail 20, an upper roof rail 10 interconnected by a plurality of vertically disposed stanchion members 11. The siding is formed by a plurality of panels or sheets 6 which are attached to the bottom and top rails as well as the vertical extrusions in a manner to be hereinafter described. The underside of the cargo-carrying box is provided with a fifth wheel 8, a landing gear assembly 1 and a rear tandem assembly 2 which includes dual tandem wheels 3. A suitable door 4 is provided in the side of the box and also the rear of the container or box portion of the vehicle is provided with horizontally swinging doors 5. These latter doors are so arranged that the entire rear of the vehicle is open without obstruction when the doors are swung from closed to open position.

In the following detailed description, where possible only one side of the vehicle will be shown and discussed, it being understood, that the construction is symmetrical about the centerline and aside from the fact that there are of necessity right and left hand parts, the details thereof are identical.

Figure 4:
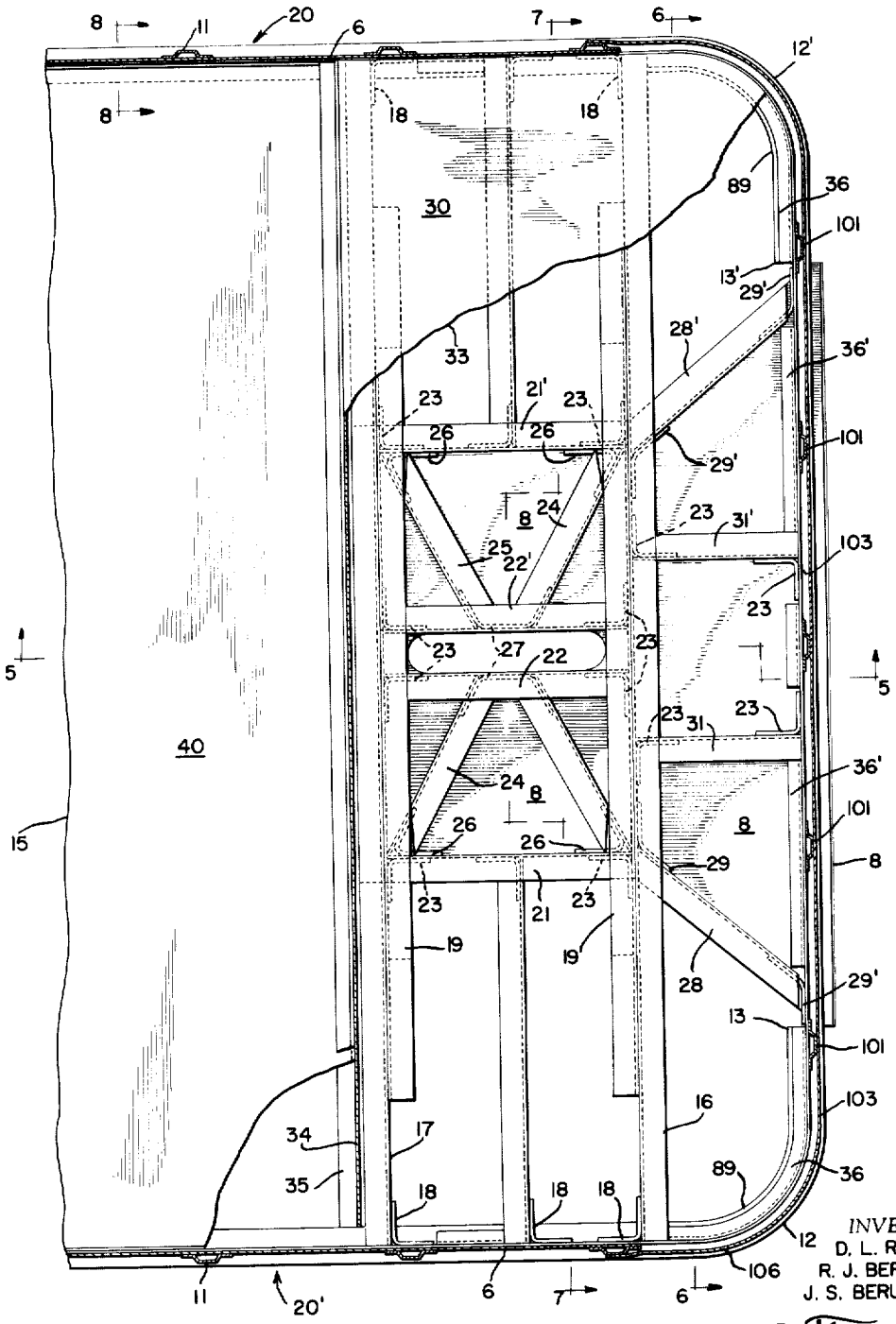
FIGURE 4 is a partial sectional plan view of the floor structure of the vehicle disclosed in FIGURE 1 and discloses the details of construction at the forward transition or fifth wheel attachment portion.
Figure 5:
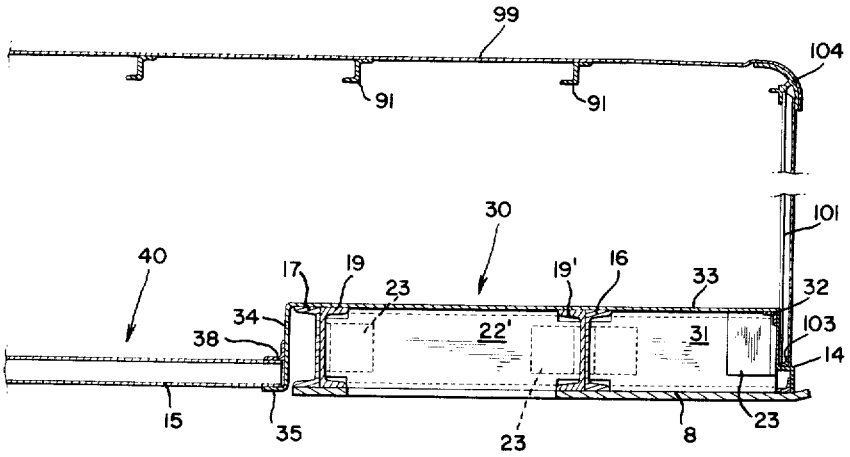
FIGURE 5 is a vertical sectional view taken along the line 5—5 of FIGURE 4.

The cargo carrying container or box is of the so-called "monocoque" type of construction. That is, no reliance is placed on the use of an independent supporting chassis, thus permitting maximum use of the interior space and providing maximum interior capacity with a generally uninterrupted interior in which cargo may be maneuvered or moved. Only one portion of the floor area is interrupted or broken, that area 30 being in the extreme forepart of the vehicle and overlying the point of articulated connection to a towing vehicle (not shown) effected through the fifth wheel structure 8. Referring now in particular to FIGURES 4 and 5, it may be clearly seen that the floor area 30 is stepped upward with respect to the floor area 40 to provide for the structural elements necessary to transmit loads to the articulated connection. It suffices to say for the moment that the area 40 is comprised of a plurality of panels 15 connected to laterally spaced pairs of specially configured extrusions comprising side rails 20, 20' the details of which will be discussed more fully hereinafter.

Figure 8:
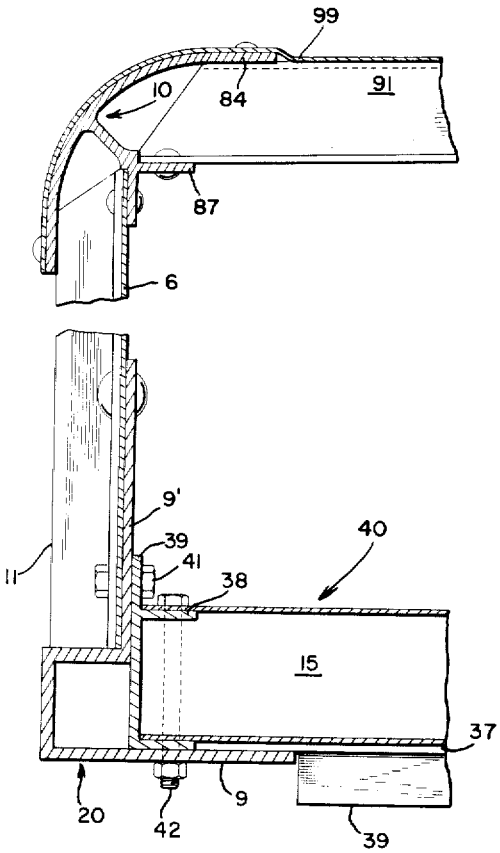
FIGURE 8 is a broken vertical sectional view through a side of the vehicle and showing detailed construction of a side, taken along the line 8—8 of FIGURE 4.

The side rails or beams 20, 20' have what may best be described as a D-shaped cross-sectional configuration including an extended horizontal lower flange 9 and an extended vertical flange 9' as may be clearly seen in FIGURE 8. The side rails 20, 20' extend from the rearmost end of the vehicle forwardly and include curved front portions 12, 12'. The curvature of these rails is such that a 90° bend is effected. Thus, the foremost terminal ends 13, 13' of the side rails 20, 20' are disposed at right angles to the main portion thereof and extend inwardly of the vehicle toward and symmetrically of the centerline of the vehicle.

The terminal ends 13, 13' of the side rails are in turn interconnected transversely of the vehicle by a horizontally extending extrusion 14 of modified Z-cross-sectional configuration having one extended arm 14', the extrusion being positioned such that this arm is disposed in a vertical plane and is contiguous with the vertical flange 9' of the side rails 20, 20'. Thus, the vertical flanges 9' of side rails 20, 20' are in effect continued across the frontal section of the container or box structure. The three extrusions may be connected together by any suitable means preferably by welding such that the desired contiguous continuity of configuration is maintained.

Spaced rearwardly of the front transverse member 14 are a plurality of additional transverse members 16 and 17 preferably structural channels which extend across the vehicle body and are connected at their respective terminal ends to the side rails 20, 20', as by welding or the like, the respective joints being reinforced by the use of right angular reinforcing brackets 18. The central portions of channels 17 and 16 are further reinforced by the use of additional channels, 19, 19' identical in configuration and arranged in back to back relation with respect to each of transverse channels 17 and 16 to define along with the channels I-beams over a portion of the length of channels 17 and 16 as may clearly be seen in FIGURE 4 and also in FIGURE 7. Also as may be seen in FIGURE 7, the top flanges of the reinforcing channels 19, 19' are extended beyond the bottom flanges by cutting the channels 19, 19' at an angle. Further referring to FIGURE 4, it may be clearly seen that the transverse interconnection of side rails 20, 20' by frontal extrusion 14 and by transverse channels 16 and 17 defines what may be described as a ladder type of frame structure.

Disposed between the transverse channels 16 and 17, in parallel relation to and symmetrical with respect to the center-line of the vehicle are a pair of forward and rearwardly extending outer channels 21, 21'. Also parallel to and symmetrical with respect to the centerline of the vehicle there is provided a pair of inner channels 22, 22'. The channels 21, 21', 22, 22' are connected to the webs of the fabricated I-beam portions of transverse members 16 and 17 as by welding, riveting or the like and again the resultant joints are reinforced by right-angular reinforcing brackets 23.

Between the corners of the generally box-shaped areas defined by forward and rearwardly disposed channels 21, and 21', and the included portions of the transverse members 16 and 17 there are provided interrupted diagonals 24 and 25 welded or otherwise connected to the corners. These diagonals are interrupted by the members 22, 22' to which they are also fixed as by welding or the like. Again, the connections effected between the diagonals 24, 25 and inner longitudinal members 22, 22' are reinforced by the use of suitable angle brackets 26. The structure thus described may be clearly understandable from an inspection of FIGURES 6 and 7 in conjunction with an inspection of FIGURE 4 and it is apparent that the webs of the innermost channels 22, 22' define a generally longitudinally elongated slot.

The juncture of the diagonals 24 and 25 is also reinforced. This reinforcement is effected by the use of generally V-shaped brackets 27 wherein the arms thereof are fixed to the webs of a portion of each of the diagonals 24 and 25 on either side of the inner channel members 22, 22'.

A built up or fabricated interconnection between the previously described transverse channel 16 and the extruded foremost transverse element 14 is also provided. Again referring to FIGURE 4 and in particular to FIGURE 6, it may be clearly seen that a pair of outwardly extending channel sectioned diagonals 28, 28' are so disposed that they have their inner terminal ends connected to the transverse member 16 and their outermost terminal ends connected to the foremost transverse extension 14 closely adjacent to its interconnection with the terminal ends 13, 13' of side rails 20, 20'. The rear terminal ends or innermost ends of these diagonals 28, 28' are connected as by welding to the web and flanges of transverse channel 16 and reinforced at this joint by suitable angle brackets 29. The forward or outer terminal ends of the diagonals 28, 28' are connected to the transverse foremost extrusion through the medium of angle brackets 29'.

Also disposed between the extruded member 14 and the transverse member 16, parallel to each other and symmetrically spaced transversely about the longitudinal centerline of the cargo carrying "box," are a pair of horizontally disposed forward and rearwardly extending channels 31, 31'. These channels are connected, as by welding or the like, to both extruded member 14 and channel 16 and the respective connection points are suitably reinforced by further use of previously described angle brackets 23.

Figure 9:
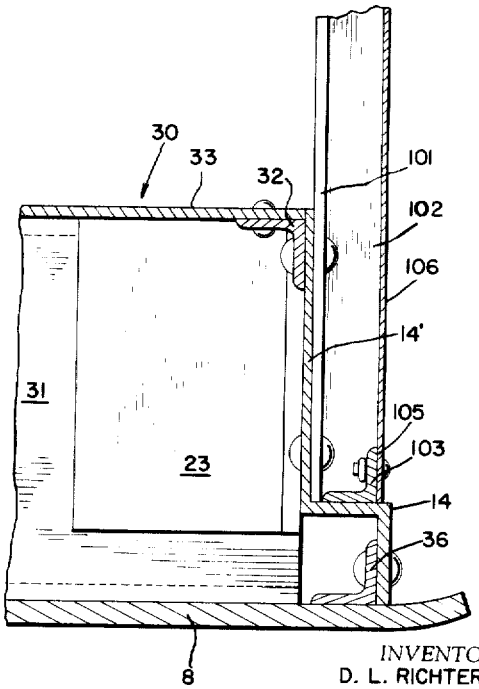
FIGURE 9 is an enlarged view showing in part some of the construction details at the transition section of the vehicle also disclosed in FIGURE 5.
Figure 5:
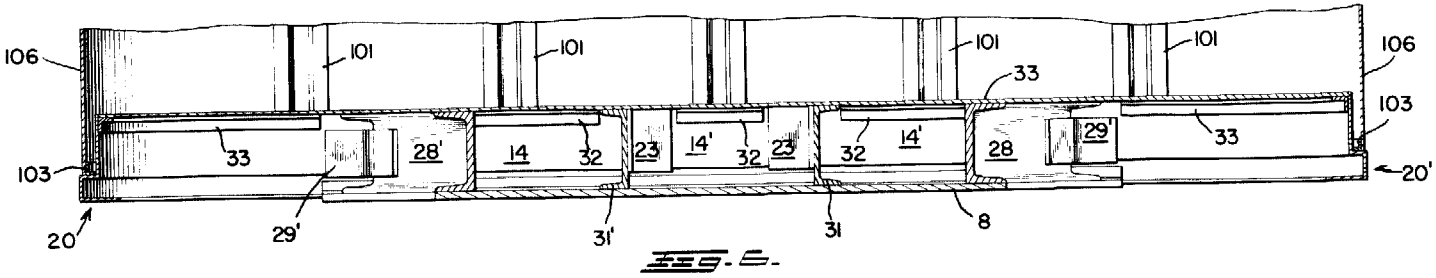

As is clearly evident from an inspection of FIGURES 5 and 9, the horizontal positioning of all of the previously described channels is such that their top surfaces or the surfaces of their flanges rest in a common horizontal plane, the purpose of which will subsequently become apparent. In this connection also, there are provided on the rear face of the vertical flange 14' of front extruded member 14 a spaced series of discontinuous inverted angles 32 which are so disposed and attached as by riveting or the like to the flange 14' such that the uppermost surfaces of the horizontal leg thereof are also coplanar with the top surfaces of the previously described channels.

Thus, it is believed readily apparent that a top skin or flooring plate or sheet 33 of the desired strength and thickness may be placed up and rest on the previously described coplanar surfaces to which it may be fixed as by counter-sunk rivets, welding or the like equivalent fastening means. This flooring sheet serves a dual function, namely to support cargo and to add rigidity to the entire described fabricated structure. The marginal edges of the front and sides of this flooring, of course, rest upon all of the channels and angles and are trimmed or fitted to the edge contour of the vertical flanges 9' and 14' of the extruded side rails 20, 20' and frontal extrusion 14. The rear edge of the floor sheet or plate terminates in a vertical wall 34 in turn provided with a transversely extending horizontal flange 35, which extends transversely across the entire width of the vehicle for a purpose to be hereinafter described.

Similarly, the bottoms of the described channel sectioned transverse and longitudinal members are coplanar along their bottom portions. Further, angle sections 36 are employed to reinforce the corner portions of side rails 20, 20' and also the transverse extrusion 14. The angles 31' are further disposed such that one leg thereof of each rests in a common plane which is also the same plane as that in which the bottoms of the various channel members rest. To the lower surfaces of the channel members 21, 21', 28, 28' the extruded element 14 by means of angles 36' and within the area bounded by channel members 28, 28', 21, 21' and that portion of channel 17 between the channel members 21, 21', is fixed a ferrous metal plate 8, the fifth wheel component shown previously in FIGURES 1 and 3. The fifth wheel component is of considerable thickness and is provided with an elongated generally oval aperture which coincides with the slot defined by the webs of the members 22, 22' as may be clearly seen in FIGURE 4. Thus, the usual articulated connection mechansim may be utilized to effect connection of the vehicle to a prime mover, such as is conventional in the art.

Thus, it may be seen that the tremendous loads, shear, torque, compression and tension that are imposed on the area 30 having been transmitted from the floor area 40 to the side rails 20, 20' and to the stepped area 30 in a manner which will be apparent, are concentrated in an area which is specially adapted to resist the deflection produced thereby and is capable of transmitting such loads through the articulated connection to the prime mover. Due to the fact that the loads are so concentrated and that as a result of such concentration the area in question must be of the maximum possible strength it is obvious that relatively deep, that is an increased dimensional, size and section must be utilized. Accordingly by the construction described such strength is obtained and with a minimum of discontinuity of the floor area of the "box" or cargo carrying vehicle.

Having thus described the fabrication and reasons for the stepped area 30, consideration will now be given to the mode whereby the remainder of the chassisless area 40 is constructed without the necessity of any type of underframe structure.

As has been stated and reference is made, in particular, to FIGURES 4, 5 and 8, the side rails 20, 20' are parallel and are comprised of generally D-shaped extrusions having extended lower horizontal flanges 9. Between these members there are provided a series of panels 15 of generally rectangular configuration. The panels are of the so-called "honeycomb-sandwich" type and form in and of themselves no part of the instant invention.

Simply described these honeycomb panels include a core formed of vertically disposed thin metal or paper strips fashioned into substantially a honeycomb-like appearance and interconnected one with the other. The honeycomb core is sandwiched between a pair of thin yet somewhat thicker metal sheets, the top and bottom of which are bonded by suitable resins and the like to the vertical edges of the honeycomb structure to form an exceptionally sturdy panel having an unusually high strength-to-weight [ration] *ratio*.

A plurality of such panels of rectangular form and having their longer sides equal to the width between the vertical flanges 9 of the spaced rail members 20, 20' may be utilized as the load sustaining flooring and are so used in the following manner.

Each of said panels is provided with extruded marginal framing elements 37, 38 completely surrounding the four edges of the panels. The extruded framing elements 37, 38 are identical, in fact, though each is applied in a different relationship on the panel edges. Framing elements 37 are applied to the longer sides and edges of the panels, while framing elements 38 are applied to the narrower sides or shorter edges of the rectangularly configured panels.

Each of the elements is essentially channel shaped in cross-sectional configuration and hence includes the usual deep webbed, comparatively shallow flanged configuration as in conventional. In addition, however, each member 37, 38 is also provided with an outwardly projecting flange 39 as clearly seen in FIGURE 8 which is coplanar with the web and coterminal with the length of each section. From further inspection of FIGURE 8, it may be seen that extruded framing elements 38 are fixed to the narrower edge of panels 15 such that the flange 39 is disposed in an upward direction and will when the panels are rested on the side rails 20, 20' parallel the longitudinal axis of the vehicle.

On the other hand, identical members 37 are inverted and fixed to the longer sides of panels 15. In other words, the framing members 37 are positioned on the longer sides of panels 15 such that the projecting flanges 39 generally extend downwardly in vertical planes extending perpendicularly to the centerline of the vehicle.

The advantages of such an arrangement are believed to be obvious. The side framing extrusions 38 with the upwardly projecting flange 39 may be readily fixed as by bolts 41 to the vertical web 9' of side rail member 20 (also similarly fixed to side rail 21 not shown) while the abutting downwardly disposed flanges of members 37 on the longer sides of the panels may be fixed together as by bolts (not shown) or the like whereby adjacent panels are locked together throughout the length of the vehicle.

Further, the downwardly disposed flanges serve to reinforce adjacent panels 15 transversely of the vehicle by in effect increasing and lowering the center of the inertia of the transverse extruded closure members 39 thus increasing the resistance of the individual panels as well as the resultant integrated floor against bending and deflection due to cargo weight carried thereon.

In addition, suitable fastening means 42 may be passed through the side, channel-shaped, panel forming extrusion 38 which serve not only to bolt the members 38 to the panels 15 but also to fix the members 38 to the horizontally extending lower flange 9 of the generally D-shaped side rails 20, 20'.

In connection with all of the fastening means mentioned in connection with panels 15 and their joinder to each other and to extrusions 37 and 38 in all cases it is preferable to use removable fastening means, such as bolts 41, 42 in order that accidentally damaged or otherwise mutilated panels 15 may be readily removed and replaced. In some cases, however, for example, where a secondary extruded floor covering, such as that shown in Patent 2,753,018 dated July 3, 1956 to C. O. Curell, would be placed over the top surface of the whole floor, panels 15 could well be permanently integrated to each other and side rail members 20, 20' as by riveting, and/or welding and the like.

Considering now FIGURES 4 and 5, it may be seen that the most forward panel of the panels 15 rests on side rail members 20, 20' as has been described. However, the leading edge of this panel is provided with an extruded channel section framing member 38 so disposed upward in contradistinction to the manner in which the framing members 37 are applied to the longer edges of the described intermediate panels 15. Thus, the flat lower flange of the framing member 38 rests on the previously described horizontally disposed, transversely extending flange 35 which is provided on the lower edge of vertical wall 34 of floor sheeting 33. While no details of the fastening means utilized to fasten member 38 to flange 35 and wall 34 are shown it will be appreciated that the same arrangement including suitable bolts such as members 41 and 42 is used to fasten framing member 38 to both vertical wall 34 and flange 35.

Figure 10:
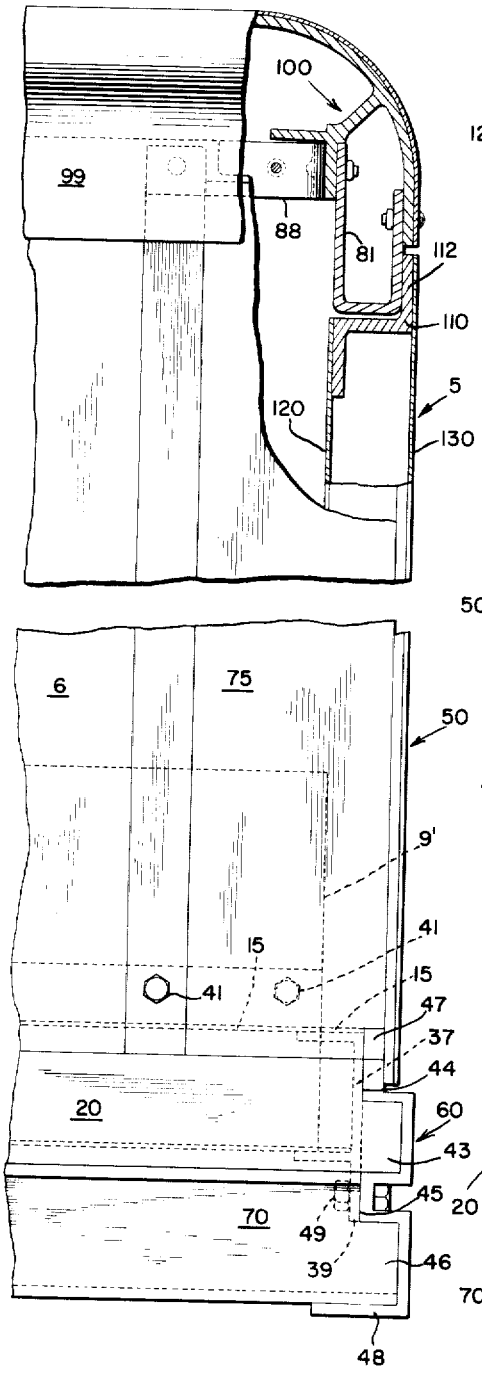
FIGURE 10 is a view, partially in section of the rear corner and side of a vehicle incorporating construction details and features according to the invention.

Considering now FIGURES 10 and 11 and having an mind that the floor structure, except for the manner of completion of the rear portion thereof has been completely described, the latter structure will be described.

As may be seen in FIGURE 10, the side rail 20 extends readwardly and is terminated in such a manner that the vertical web portion of the modified D-shaped section is provided with a rearwardly projecting tongue portion 43 which projects beyond and below a terminal edge 44. Also fixed to the bottom horizontal flange of the side rail 20 is an inverted generally channel shaped member 70 the purpose of which will be explained subsequently which also has a stepped rearmost edge comprising a vertical edge 45 and a tongue portion 46.

A transverse sill and framing member 60 extends across the entire width of the vehicle and connects the rear ends of the side rails 20, 20'. This sill member is roughly M-shaped in cross section but is modified to include a flange 47 projecting from one leg and having further an extended leg 48. Thus, it may be seen that the projecting tongue portions 43 interfit within one hump of the modified M-shaped sill, while the tongue portion 46 of member 70 interfits within the other of the humps in sill member 60. Preferably, the described interconnection of sill member 60, side rails 20 and modified channel members 70 forms an all welded joint.

Considering now the rearmost panel of the floor panels 15, is may be seen that the framing member 37 is in abutment with the vertically extended flange portion 47 of sill member 60. The downwardly projecting vertical flange 39 is also in abutment with the sill member 60 and is bolted thereto by suitable bolt means 49. Thus, the rear edge of panel 15 through the medium of its transverse framing member 37 is fixed to the transversely extending sill and rear cross member 60 and the floor, the side rails 20, 20' and the member 60 are jointed to form a rigid, sturdy rear interconnection transversely of the vericle resistant to impact, torque and compression loads with equal facility. Having thus described an integrated frameless floor construction which is unique in the art, consideration will now be given to the manner in which the side, roof, doors and tandem unit may be attached to the basic floor structures. Since the front floor construction has been described, attention will be given first to the manner in which a tandem wheel supporting structure may be attached to the unique chassisless or frameless load carrying floor structure whereby the entire suspension system may be moved longitudinally of the vehicle to accomplish the variation in weight distribution as set forth in the initial portions of the instant disclosure.

Figure 18:
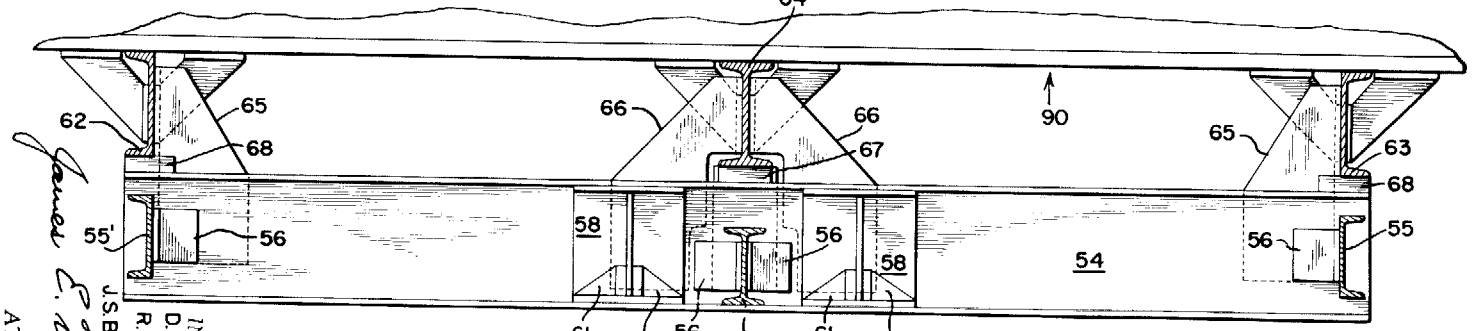
FIGURE 18 is a sectional view taken along the line 18—18 of FIGURE 16.
Figure 19:
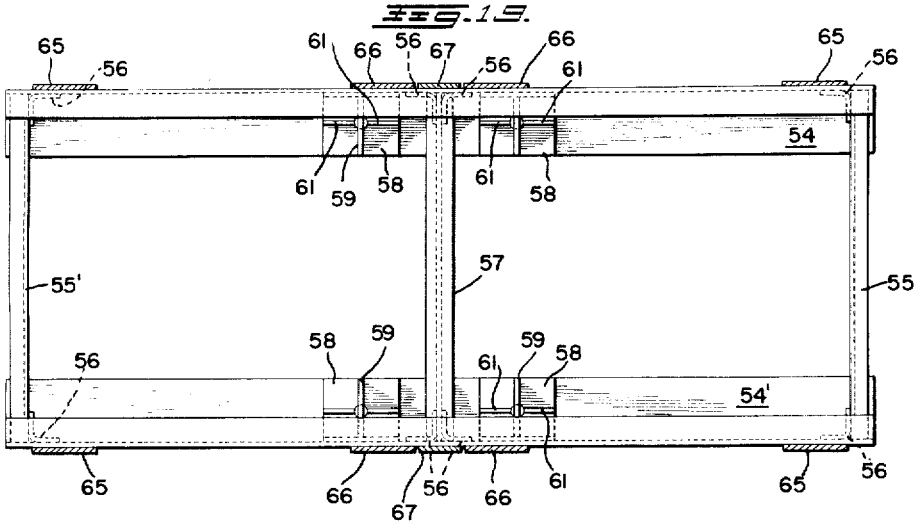
FIGURE 19 is a top plan view of the lower portions of tandem wheel carriage taken along the line 19—19 of FIGURE 17.
Figure 20:
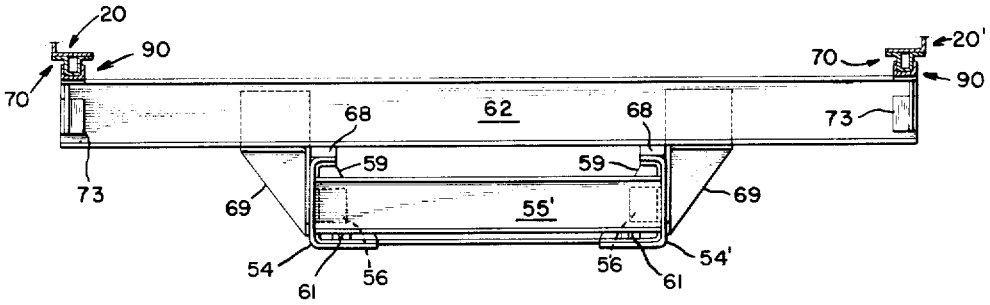
FIGURE 20 is a rear elevational view of the tandem carriage, taken along the line 20—20 of FIGURE 16.
Figure 21:
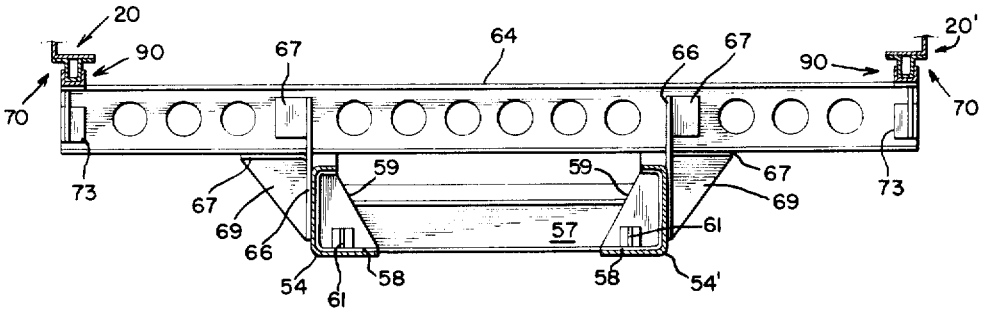
FIGURE 21 is a sectional view taken along the line 21—21 of FIGURE 16.

In this connection, attention is directed to FIGURES 16 through 21 with FIGURES 16, 20 and 21 being discussed and described initially. Also for clarity the entire structure is disclosed in the drawings rather than merely one side as was done in connection with the previously discussed matter.

As previously described the modified D-shaped side rail extrusions extend forward and rearwardly of the vehicle in parallel relation to each other and the centerline of the vehicle throughout its length. Further, portions of the side rails 20, 20' have an inverted, generally channel-shaped somewhat modified structural shape 70 fixed to their respective horizontally extending flange portions 9. The member 70 also includes a pair of coplanar horizontally disposed flanges 51 and 52 which are fixed as by bolts 53 to the side rail flange 9. Thus, for at least a portion of the vehicle, the flange portions 9 of side rail members 20, 20' and members 70 combine to form what may be described as a box beam section having uninterrupted vertical and bottom walls.

In the instant disclosure, the members 70 are so arranged as to extend approximately one-third of the total length of the vehicle, as may be clearly seen in FIGURE 1, though it will be appreciated that a greater or lesser length of fabricated box beam section may be used as may be found advantageous or desirable. To these uninterrupted sections there is attached in slidable relation the tandem subframe to be described.

The wheeled subframe may include the usual and conventional leaf spring suspension and shock absorbing medium or preferably, it may be used in conjunction with an air spring tandem arrangement disclosed in copending application Serial Number 603,728, filed August 13, 1956 and now Patent No. 2,943,864. In either case no disclosure of such subject matter is made in detail since the specific suspension system forms no part of the instant invention. The drawing of the entire vehicle as represented by FIGURES 1, 2 and 3 includes a suspension system generally of the latter type merely to illustrate a complete vehicle. Too, the subframe to be described would be identical in either case and hence, disclosure thereof is common, that is, the same details would be disclosed regardless of the system used.

Accordingly, referring to FIGURE 19, it may be seen that the subframe is comprised of a pair of laterally spaced, longitudinally extending unequally flanged channel members 54, 54'. These channels are so disposed as to position the webs thereof toward the outside of the vehicle. Extending transversely of the channels and connected thereto at the forward and rearward ends are a pair of connecting channels 55, 55'. Suitable reinforcement angles 56 are utilized to reinforce the connection point of the respective channels 54, 54' and 55, 55', as clearly seen in FIGURE 17. The oppositely facing channels are further connected generally centrally of their length by a transverse I-sectioned beam 57. Again suitable reinforcing angles 56 are utilized to rigidify the joints or connection points between the terminal ends of beam 57 and channel members 54, 54'.

Closely adjacent to and to either side of the transverse member 57, the unequally flanged forward and rearward channels 54, 54' as may be clearly seen in FIGURES 18 and 21 are additional reinforcements. These reinforcements comprise a plurality of channel-shaped inserts 58 which interfit within the respective channels 54, 54'. These inserts are disposed two to each channel and are located symmetrically with respect to and to either side of the centerline of I-beam section 57. Additional reinforcing of the area is effected by means of vertically positioned gussets 59 which are fixed within the reinforcing inserts 58 and further by small longitudinally extending vertically disposed plates 61. Thus, a lower, rectangular, rigid subframe assembly is formed upon which the cushioning system, whether leaf spring or air spring, may be mounted. Also to be noted is the fact that the described subframing is of considerably less width than either the vehicle or the remainder of the suspension carriage to be described. The reason for this arrangement becomes obvious from a brief inspection of FIGURE 2 wherein it may be seen that the tread distance between the outermost wheel of the dual wheels on a given axle is such that these wheels do not project laterally outwardly beyond the sides of the vehicle.

Considering now FIGURES 16, 18, 20 and 21, it may be seen that the previously described subframe assembly is interconnected with a plurality of transversely extending beams and channels 62, 63, and 64 which are of a length equal to the lateral spacing between side rail members 20, 20', or to the width of the vehicle. Channel members 62 and 63 are disposed vertically above and parallel to channels 55, 55' respectively while an I-sectioned beam 64 is similarly located with respect to previously described member 57. The top flanges of all of these transverse members 62, 63 and 64 are disposed in a common horizontal plane.

The connection of members 62, 63 and 64 to the subframe is effected through the medium of vertically disposed plate members 65 and 66. Plate members 65 are fixed to the webs of channel members 54, 54' respectively in face-to-face relation and to the transverse channels 62 and 63 with their upper edges in bearing relation against the webs of these transverse channel members and further include angularly disposed pads 67 which are fixed also to the web of the respective channels 62 and 63. Suitable inserts 68 act as spacers between the top flanges of channels 54, 54' and the bottom flanges of transverse channels 62 and 63.

Referring to FIGURES 18 and 21, it may be seen that the transverse I-beam member 64 is provided with lightening holes to reduce the weight thereof as is more or less conventional. This member 64 is, of course, of the same length as are transverse channels 62 and 63 and is parallel to and coterminus with respect thereto, and is fixed to the parallel, longitudinal channels 54, 54' by means of angle members 67 having one leg in face-to-face contact with the webs of channels 54, 54' and the other in face-to-face contact with its own lower flange. Suitable vertical plates 66 are also used to stabilize the beam transversely, i.e., to prevent forward and rearward twisting or rocking of the member transversely of or normal to its length. Also, suitable gussets 69 are used to reinforce the angle members 67.

Figure 22:
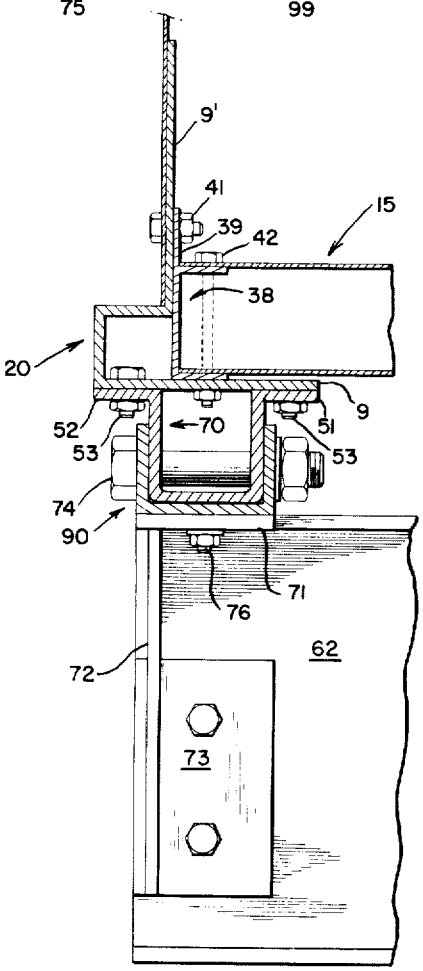
FIGURE 22 is an enlarged view partially in section, disclosing details of the attachment means whereby the tandem carriage may be adjustably fixed relative to the length of the vehicle.

Referring now in particular to FIGURES 16 and 22, it may be seen that the coterminus and coplanar ends of the transverse channel 62, beam 64 and channel 63 are connected to parallel, coplanar, transversely spaced inverted, saddle-like members 90. The saddle members 90 are inverted channel-shaped elements of a length only slightly greater than the length of the subframe channels 54, 54' and are of such size or dimension from flange to flange as to snugly but slidably engage the uninterrupted box members 70 previously described. Thus, the inverted saddle-like members are movable longitudinally of the vehicle or vice versa to the extent that the length of members 70 permit.

The saddle-like members 90 are fixed to the respective terminal ends of members 62, 63 and 64 by means of a plurality of pairs of flat horizontal pads 71, bolts 76 being used to anchor members 90 to pads 71. These pads 71 are in turn fixed to vertical diagonally disposed plates 72 having vertically positioned tongues 73 bolted to the webs of the members 62, 63, and 64 respectively. Thus, movement of the inverted, saddle-like members 90 with respect to side rails 20, 20' results in movement of the entire tandem wheel assembly 2 with respect to the "box" or cargo carrying portion of the vehicle. The members 70 and 90 are connected also by bolts 74 and member 70 is provided with a longitudinally spaced series of apertures through which may be passed bolts 74 such that the entire tandem assembly may be locked in a plurality of selectable longitudinal positions beneath the vehicle and thus, the weight proportioned between the fifth wheel 8 and the tandem assembly 2 may be varied at will.

With the exception of the bolted interconnection between members 70 and 90 and pads 71 and saddle-like members 90, all of the above described joints utilized in fabricating the tandem assembly 2 may be welded joints, though other permanent type fasteners, such as rivets, may be used equally well. The fastening members 76 of necessity must be of the countersunk head type such as not to interfere with the slidable movement between members 70 and 90.

By way of example of the tremendous utility arising by reason of the longitudinal mobility of the tandem assembly 2 with respect to the cargo carrying floor, let it be assumed that the gross weight of the loaded vehicle meets the statutory requirements of two adjoining states A and B but the weight distribution between tractor wheels and semi-trailer wheels is such that the statutes of state B as to weight distribution would be violated. The operator may simply stop and by consulting previously prepared computations determine at what position of the tandem wheel the new proper distribtuion might be obtained. Then by removing bolts 74 and braking the tandem wheels while backing or moving the tractor, the "box" or cargo carrying body will be moved relative to the tandem the required distance. The bolt or bolts 74 are then replaced and the fixed relationship between tandem wheels and body is reestablished and the trip is continued.

Having thus described the basic concepts of construction of the vehicle under consideration attention will now be directed to the manner in which the top, sides, doors, etc. are fabricated with extensive use being made of light metal extrusions, sheet and the like.

Referring in particular to FIGURES 1 and 8, it may be seen that a plurality of extruded hat-sectioned vertical posts or stanchions are positioned at generally regularly spaced intervals along the sides of the vehicle. Between the posts or hat-sectioned stanchions and disposed inwardly thereof is sheet metal siding 6. The siding may be a continuous sheet or be comprised of a plurality of individual panels joined together as desired, either of which arrangements is conventional in the art. Both the siding 6 and hat-sectioned extruded stanchions 11 are fixed as by riveting to the vertical flanges 9' of the extruded side rail members 20, 20', and the continuity of spacing between vertical stanchions 11 is interrupted only by the provision of side door 4 intermediate the front and rear of the vehicle. The tops of these stanchions 11 as well as the top edges of the panels or siding 6 are longitudinally connected by means of an extruded roof rail member 10.

Figure 12:
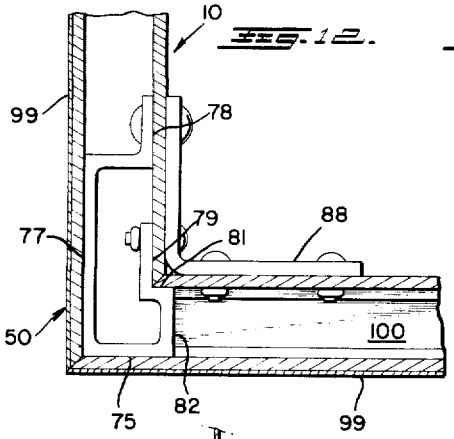
FIGURE 12 is a sectional view taken along the line 12—12 of FIGURE 11.

In order to reinforce the rear portions of the sides of the vehicle an extruded post 50 is used in place of a stanchion 11. Referring to FIGURE 12, it may be seen that the rear corner post 50 has uninterrupted, planar right angularly disposed sides 75 and 77. The post 50 also includes an outwardly extending flange 78 projecting toward the front of the vehicle and a similar flange 79. These two flanges are coplanar and both are parallel to the longer of the uninterrupted planar faces 77. Both of these flanges 78 and 79 are fixed by bolts 41 to the vertical flanges 9' of the side rail members 20, 20' as by bolts 41. The rear terminal edge of the side sheeting terminates adjacent the shoulder 81 formed by the offset relationship between flange 79 and the inner face portion 82 of the corner post 50.

The upper end of the corner post 50 is connected as by riveting or the like to a suitable casting 80 to be described which in turn is welded to the rearmost terminal end of roof rail extrusion 10. The rear corner posts 50 are connected by means of an extruded member 100, similar in cross-sectional design to roof rail 10 which, of course, is connected to the right side of the vehicle (the rear left hand corner construction having been described in detail and shown in FIGURES 10, 11 and 12) is a similar manner. Also extending transversely across the vehicle and fixed to the previously mentioned extruded member 100, is a generally U-shaped door framing member 81 which serves both as a bottom closure member for extruded member 100 and as a framing member against which the pair of rear doors 5 may abut as shown in FIGURE 10.

Referring now to FIGURES 1, 3, 4 and 9, it may be seen that the forward face or side of the vehicle is formed with a smooth surface 88. This surface is carried in uninterrupted fashion around the front corners of the vehicle and terminates at the foremost stanchion of the vertically positioned stanchions 11 forming one of the side construction elements 11. Similar stanchions 101 are positioned in spaced parallel vertical relation across the front of the vehicle and have their lower terminal ends fixed as by riveting or the like to the previously described Z-shaped member 14. Also fixed to the member 14 is a comparatively small channel member 103 having a vertically disposed face 105. This latter angle is interrupted at spaced points by vertical stanchions 101 and further has its vertical face so arranged as to be coplanar with the outermost face 102 of the vertical stanchions such that the lower edge of the frontal sheet 106 comprising the unbroken surface 88 may be attached at its lower edge thereto and periodically to the outer face of the stanchions 101. Again, as in the case of side stanchions 10, the top of stanchions 101 and the top marginal edge of sheet 106 are connected to a transverse extrusion 104 in a manner to be described. Again suitable corner castings (not shown in detail) may be used to interconnect the transverse extruded element 104 to the roof rails 10 on either side of the front of the vehicle.

Figure 13:
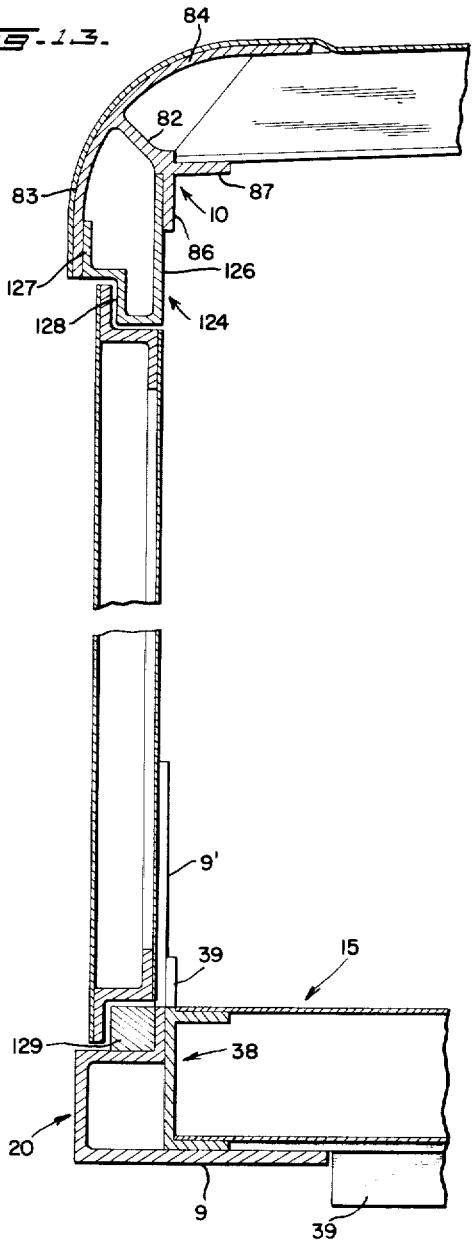
FIGURE 13 is a typical sectional view taken through a side of the vehicle and showing details of floor, door, and roof construction in a vehicle including side doors, such as are clearly shown in FIGURE 1.

Referring now to FIGURE 13, the shape of the roof rail 10 will be described. In this connection, the configurations of the extruded members 10, 100 and 104 are identical, hence a description of one will suffice for a description of all of such elements. Thus, it may be seen in FIGURE 13 among others, that the extruded member is generally T-shaped in cross-section including a straight stem 82 and an arcuate cap comprised of arms 83 and 84 of such a length that their terminal edges are disposed at right angles to one another. A pair of right angularly disposed feet 86, 87 are provided at the lower end of the stem, these feet being in parallel, spaced relation to the right angular terminal edge portions of generally arcuate arms 83, 84. The spacing between the parallel portions of arm 83 and foot portion 86 and 84 and 87, respectively, is such that stanchions 11 and 101 along with side sheeting 6 and front sheeting 106 will fit between these portions of the members 10 and 104 and may be fixed thereto as by riveting or the like.

Thus, too, it becomes apparent that because of the contour of the roof rails 10, the rear transverse member 100 and front transverse member 104 that some means must be employed to enable joinder of these members at the corners of the vehicle. Since it is desirable that the continuity of contour, i.e. rounded corners is desirable and because of the obvious difficulties presented in attempting to bend, if possible, a section such as that described, the various members are interconnected by transition castings welded or otherwise fixed to the terminal ends of adjacent angularly disposed cap members such as the casting 80, shown in FIGURE 11, used to connect the rear terminal end of roof rail member 10 to similarly configured cross member 100. Thus, such castings are used at each of the four corners of the vehicle.

Considering briefly both the front and rear corners of the vehicle, it is believed worthy to note that an internal angular brace is used in conjunction with the joining of castings 80 and roof members 100 and 10.

A further arcuate brace means 89 of angle-shaped cross section and formed to the proper arc between its ends is fixed at each of the front corners (see FIG. 7) to side stanchions 11 and front stanchions 101 and serves to reinforce the curved corner contours of sheet 106.

Figure 7:
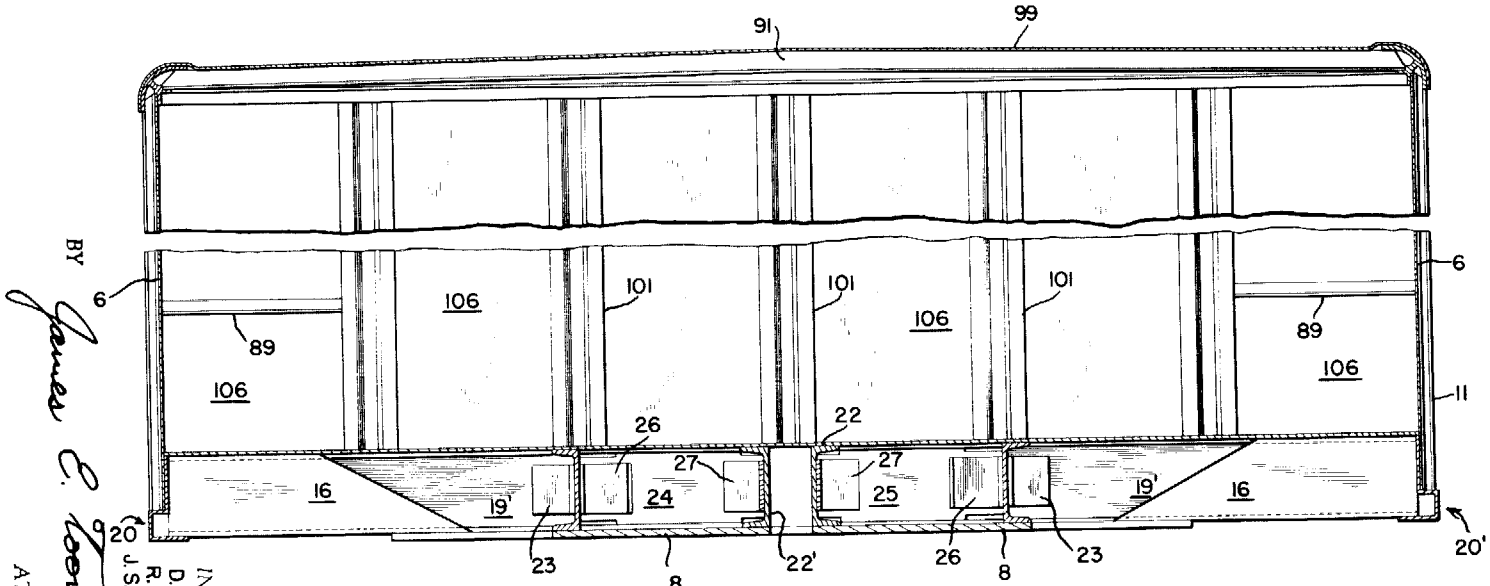
FIGURE 7 is another vertical sectional view taken along the line 7—7 of FIGURE 4.

In completing the closed vehicle, and reference is made to FIGURES 5, 7 and 8, a suitable roof structure is formed by providing transverse roof support members at longitudinally spaced points across the top. These support members 91 are generally Z-shaped in cross section and are fitted within and fixed to the parallel portions 84 and 87 of the side rail members 10. The whole roof framing thus described is covered by suitable sheeting 99 cut to fit the multiple contours and extended over the top framing members to cover all such members as is clearly evident in FIGURES 7, 8, 9 and 13 and as is conventional in the art. Preferably, too, the members 99 are bowed slightly from end to end such that the entire top of the vehicle may be slightly arched from side to assure run-off of water and other moisture which would otherwise be entrapped.

Further, suitable mastic fillers may be applied at the joints of roofing and siding as may be found necessary or desirable to assure formation of a water-tight vehicle, as is conventional in the art.

The horizontally swingable rear doors 5 are mounted on a plurality of conventional hinge components 105' fixed in any conventional manner to the rear corner posts 50 as is clearly evident from an inspection of FIGURE 2.

Figure 11:
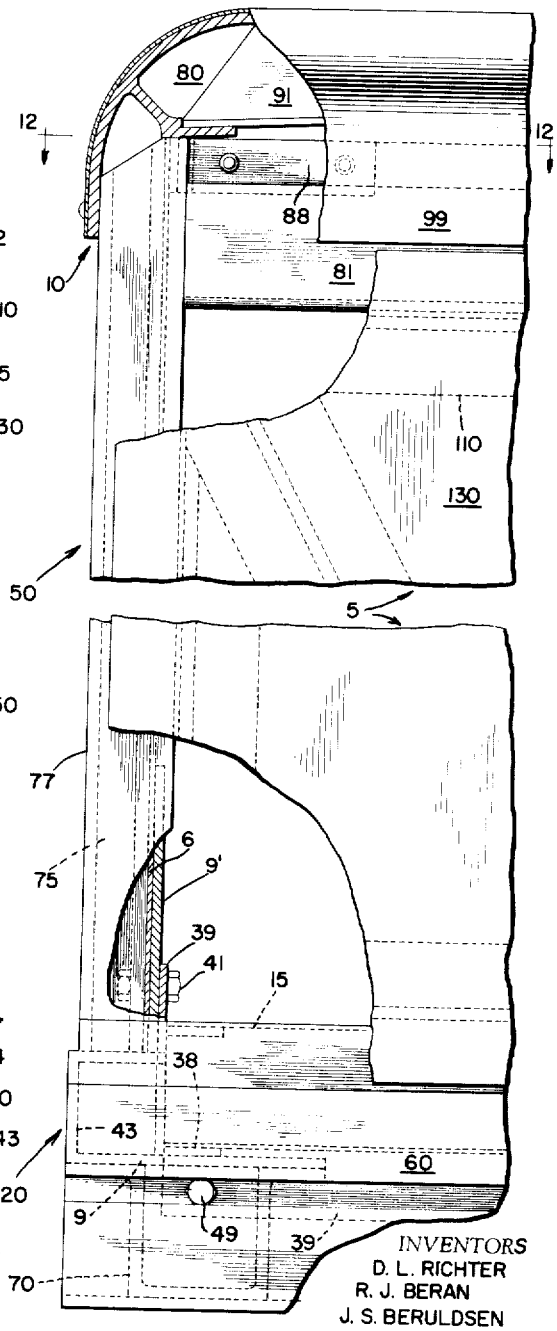
FIGURE 11 is a rear and side view of a corner portion of the vehicle and disclosing further details referred to in FIGURE 10.
Figure 14:
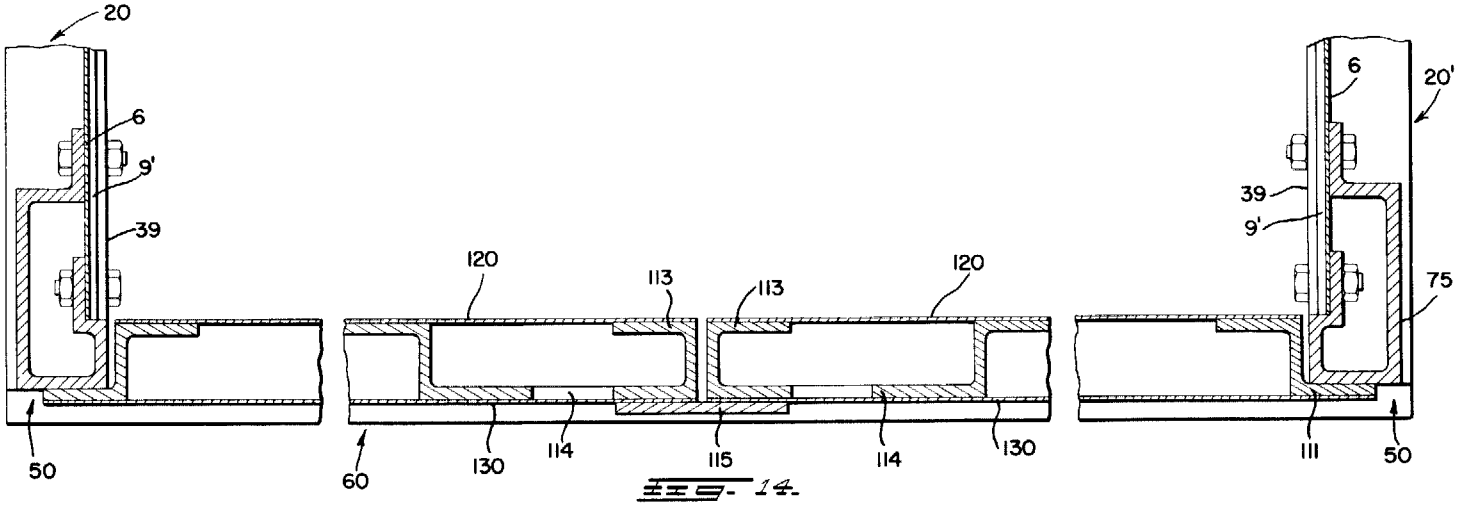
FIGURE 14 is a sectional view of a portion only of the rear of a vehicle such as shown in FIGURE 1 showing door, corner and side construction details.

Referring to FIGURES 11 and 14, it may be seen that each of the rear closures 5 is fabricated of light metal structural shapes of conventional cross-sectional configuration, sandwiched between a plurality of spaced parallel sheets 120, 130. The hinge or outside edges of the doors 5 as well as the top and bottom edges are formed by generally Z-shaped sections 111, 112 so disposed as to form a marginal coplanar flange adapted to engage the coplanar surfaces of rear corner post 50, top framing member 81 and lower sill member 60. The inner or mating edges of the doors are formed from channel shaped sections 113 so positioned that the webs of the sections are in abutting relation when the doors are closed as shown in FIGURE 14. Thus, the Z-shaped sections 111 and 112 and the channel shaped section 113 of each door form a rectangular frame of a height equal to the height of the rear opening in the vehicle, and of a width equal to one-half the width of this same opening. The frames are further reinforced by diagonal, Z-sectioned elements 114, the respective assemblies being provided with the inner and outer sheet members 120, 130 as previously described. Additionally, one of the mating edges of the two doors is provided with a relatively heavy sealing strip 115 which overlaps the other of the doors as clearly seen in FIGURE 14. The structure described may, of course, be of all welded design or may be of riveted construction as may be found desirable.

Figure 15:
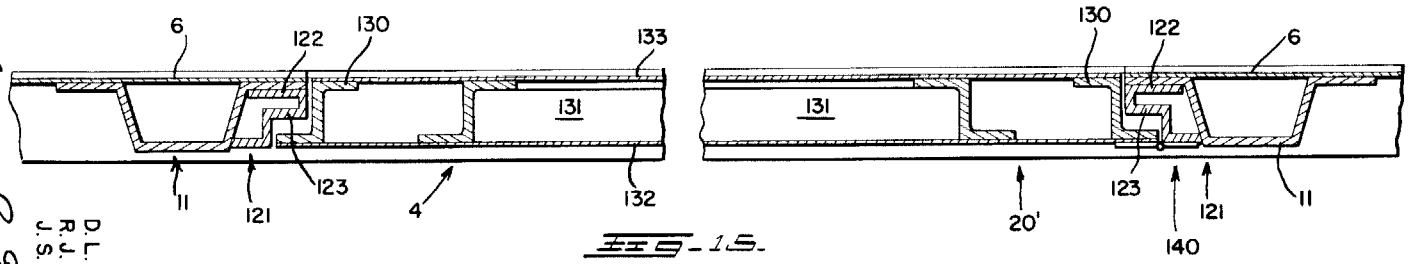
FIGURE 15 is a sectional view of a part of the vehicle wall, flooring details being omitted, taken along the line 15—15 of FIGURE 1.
Figure 15:
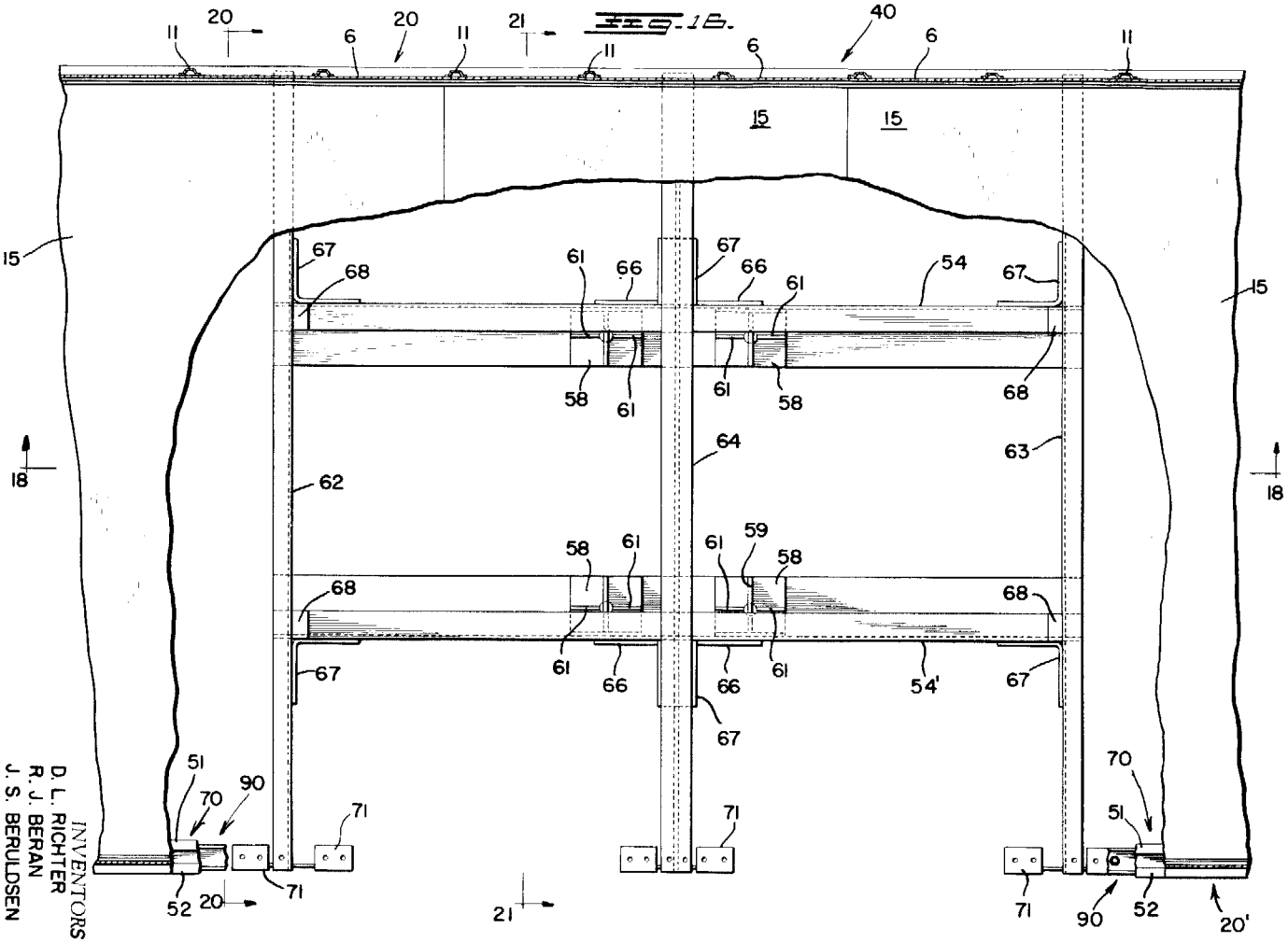
Figure 17:
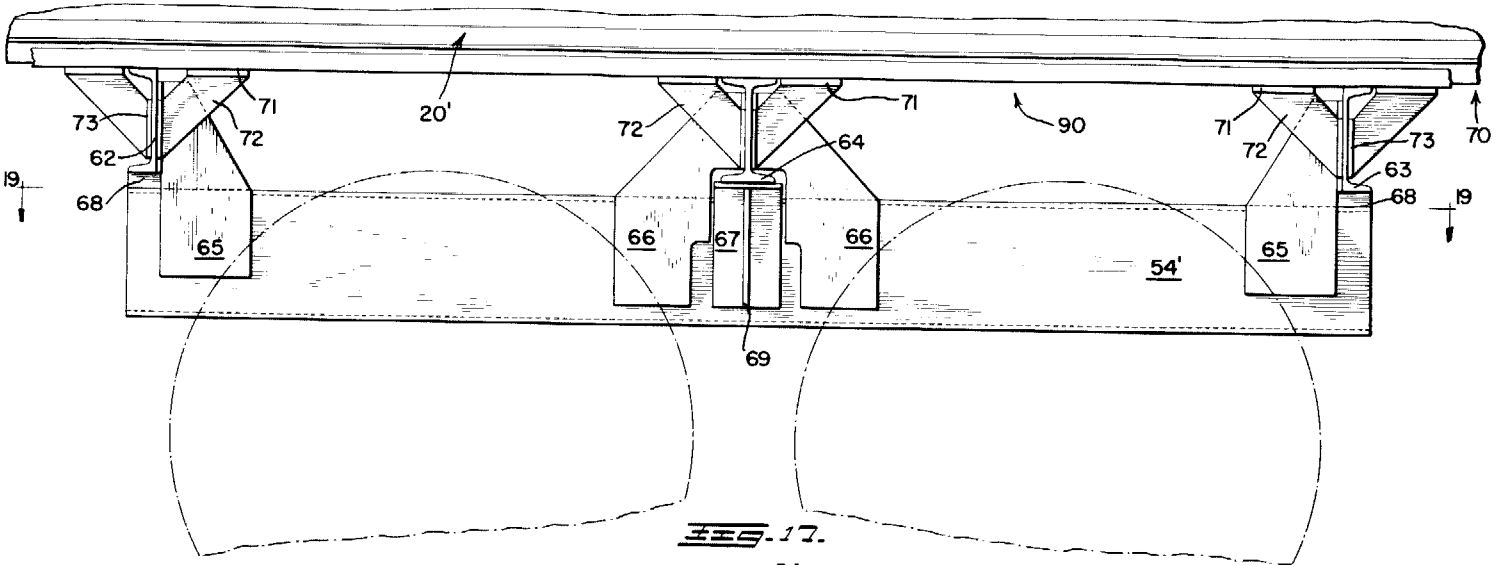
FIGURE 17 is an enlarged side elevation of a movable tandem wheel carriage shown in FIGURE 16.

Referring now to FIGURES 13 and 15, the details of the side access door construction, if used and preferably the vehicle will be so constructed, will now be described in detail. As has been indicated, the continuity of spacing of the stanchions 11 along the side of the vehicle is interrupted at that area in which the door 4 is provided, as shown in FIGURE 1. Thus, two of the vertical stanchions adjacent the door opening serve as primary framing members and are reinforced by the use of secondary extruded members to form proper framing members.

The modification is affected by providing a pair of vertically disposed, modified W-shaped extruded members 121 along the sides of the door framing members 11 as clearly shown in FIGURE 15. The W-shaped members are modified to the extent that one wing 122 of the section is broken so as to parallel the diagonal central connecting webs 123. This latter portion is fitted into face-to-face relation with the outer face of the inner, i.e. door facing flanges of the hat sectioned extrusions 11. Thus, the framing stanchions 11 adjacent the door form side framing members having flat coplanar faces against which the marginal flange-like edges of the doors may abut.

Since the roof rail 10 would not form the most desirable top framing for the opening a closure member 124 is inserted between the downwardly facing portions 83 and 85 thereof. This member includes parallel surfaces 126, 127 and an inwardly offset face 128 also parallel to the parallel faces 126 and 127 and coplanar with the framing faces formed by one diagonal of the framing members 121 previously described.

The sill of the opening is formed by removing a portion of flange 9' of side rail 20 and also of flange 39 of a panel framing member or members 38 for a distance equal to and coextensive with the width of the door opening. Also a sill member, preferably a generally square bar 129 is provided, as shown in FIGURE 13 along the remaining portions of side rail 20. The member 129 serves not only to provide a surface against which the bottom marginal flange of the door may abut, but also reinforces the side rail 20 where it otherwise might be weakened by the removal of of flange 9'.

The actual closure 4 is fabricated much in the manner as rear closures 5 of conventional Z-shaped structural sections 130' and diagonally positioned sections 133 sandwiched between inner and outer panels 132 and 133. Thus, the members 130' are so positioned as to form a rectangular marginal flange as may be seen in FIGURE 15, which abuts against the coplanar rectangular surfaces of members 121, 124 and 129 as described. A suitable hinge, preferably a piano-type hinge 140 is used to swingably connect the door structure to one of the framing members 121. Of course, a suitable or suitable gaskets may be utilized to form a leak proof seal between door edges and framing members as is conventional. Again all components utilized in forming both door and frame may be welded to each of its respective other components or other types of fastening means may be used as desirable.

Referring now to FIGURES 1 and 3, it may be seen that the vehicle is provided with a "landing gear" assembly 1, so called, which may be and is utilized to support the front end of the vehicle when the prime mover is disconnected as during loading and unloading or for various other reasons. This assembly 1 is comprised of a pair of vertical struts 141 having pan wheels 142 rotatably fixed to their lower ends. The struts are connected laterally by a tubular bar 145.

Suitable fabricated supports 150 are connected to the lower horizontal flanges 9 of side rails 20 and 21 and castings 146 are utilized to connect the vertical struts 141 to the fabricated supports 150.

If desired, the vertical struts may be provided with a mechanism (not shown) whereby the wheels 142 may be moved upward or downward to assure a level position of the vehicle, forwardly and rearwardly while supported thereon and, additionally whereby the wheels 142 may be raised to assure sufficient ground clearance when the semi-trailer is connected to the usual tractor.

Having thus described a novel cargo carrying vehicle in detail, it will be readily apparent that an extremely light sturdy construction is herein provided, which may to some extent be varied, such variations being within the spirit and scope of the invention as defined by the following claims, wherein what is claimed is:

1. A monocoque van-type vehicle for transporting cargo comprising in combination a frameless cargo receiving floor including longitudinally extending, laterally spaced side rails and floor panels disposed therebetween, means including vertically and horizontally disposed flanges on said rails for receiving and supporting said floor panels, said rails also acting as the principal support elements for said floor panels, said floor panels having upwardly porjecting flange means securable directly to the vertically disposed flanges on said side rails, the forward load supporting construction of said floor including an element facilitating an articulated connection of the vehicle to a prime mover, and means securable directly to the horizontally disposed flanges of said rail members for removably and slidably receiving and supporting a rear wheel suspension means.

2. A monocoque van-type vehicle for transporting cargo comprising in combination a frameless cargo receiving floor including longitudinally extending, laterally spaced side rail members, floor panels disposed therebetween, means including vertically and horizontally disposed flange means on said rail members for receiving and supporting the end marginal edges of said floor panels, said rail members also acting as the principal support elements for said floor panels, upwardly and downwardly projecting flange means on said floor panels, said upwardly projecting flange means being securable directly to the vertically disposed flange means on the rail members and said downwardly projecting flange means acting to rigidify the floor panels and increase their resistance to bending and flexing and channel means securable to the horizontally disposed flange means on said rail members for adjustably receiving and supporting a rear wheel suspension means.

3. A monocoque van-type vehicle for transporting cargo comprising in combination a frameless cargo receiving floor including longitudinally extending and laterally spaced side rail members, a forward load supporting fabricated construction including an element facilitating an articulated connection of said vehicle to a prime mover, said cargo receiving floor further including a plurality of individual load supporting honeycomb-type panels disposed in edge-to-edge contacting relation and forming a floor area extending from the rearmost portion of said forward load supporting fabricated construction to the rearmost edge of said vehicle, means anchoring the end marginal edges of the panels to said side rail members, said means including vertical and horizontally disposed flange means on said rail members and an upwardly projecting flange means on said floor panels, said upwardly projecting flange means on the floor panels being directly securable to the vertically disposed flange means on said rail members, said rail members also acting as the principal support means for said panels, said floor panels also being provided with downwardly projecting flange means which act to rigidify and strengthen the panels against flexing and bending and channel means secured to the horizontal flange means of said rail members for removably and slidably receiving and supporting a rear wheel suspension means.

4. In a monocoque van-type vehicle for transporting cargo the combination of laterally spaced forwardly and rearwardly extending rail members, said rail members having horizontally and vertically disposed flange means, means including an element facilitating articulated connection of said vehicle to a prime mover, means connecting said rail members at their forward ends, means connecting said rail members at their rearmost ends, a floor for said vehicle comprised of a plurality of honeycomb panels disposed in longitudinally abutting, fixed relation with respect to each other, said panels extending transversely of the longitudinal axis of the vehicle and substantially encompassing the area bounded by said forward interconnection means, said rearward connection means and said rail members, said floor panels being further provided with a downwardly projecting and an upwardly projecting flange means, said floor panels being directly secured to said rail members by means of the upwardly projecting flange means thereon, the downwardly projecting flange means on said floor panels acting to rigidify said panels against bending and flexing and said rail members serving as the principal support means for said floor panels.

5. In a floor construction for a monocoque vehicle including longitudinally extending side rail members and means for fixedly interconnecting said side rail members in laterally spaced horizontal relationship at their forward and rearmost ends, the improvement comprising a plurality of transversely extending edge-to-edge abutting panel elements in engagement with and fixed in removable relationship to said side rail members, said side rail members having vertically and horizontally disposed flanged means for supporting said panel elements, said rail members also acting as the principal support means for said panel elements, each of said panel elements being of honeycomb-type construction and including upwardly and downwardly projecting flange means, said upwardly projecting flange means on said panel elements being securable directly to the vertically disposed flange means on said rail members and said downwardly projecting flange means on said panel elements being disposed at the longitudinal side edges thereof and acting to stiffen and reinforce said panel elements against distortion and bending.

6. A closed cargo monocoque construction for a vehicle comprising in combination a pair of laterally spaced, horizontally disposed side rails including co-terminus horizontal and vertical flanges, a transversely extending cross member fixedly interconnecting the rearmost ends of said side rails, a forward assembly including means facilitating an articulated connection of said vehicle to a prime mover and interconnecting said side rails at their foremost ends, a plurality of laterally extending edge-to-edge abutting honeycomb-type panel members extending between said side rails and fixedly but removably interconnected to said side rails and to each other, certain marginal edges of said panel members being supported on the horizontal flanges of said side rails, said panel members also being provided with upwardly and downwardly projecting flanges, said upwardly projecting flanges on said panel members being securable directly to the vertical flanges on said side rails, means passing through said horizontally extending flanges on said side rails and engaging said honeycomb panel members, said downwardly projecting flanges on said panel members acting to stiffen said panel members against distortion and bending, said side rails also acting as the primary support means for said panel members, a plurality of vertically positioned longitudinally spaced stanchion members in engagement with the vertically disposed flanges on said side rails, a top interconnecting means in engagement with each of said vertically disposed stanchion members, sheet covering means in engagement with said side rails, said stanchion members and said top interconnecting means, and a roof structure in engagement with said top interconnecting means, said stanchion members, said sheet covering means, said panel members and said roof structure defining a closed weatherproof vehicle.

7. A closed cargo carrying monocoque-type vehicle comprising in combination a pair of longitudinally extending laterally spaced side rails, said side rails including horizontally and vertically disposed flange portions, a transversely extending cross member fixedly connecting the rearmost ends of said side rails, means including an element facilitating articulated connection of said vehicle to a prime mover and interconnecting the foremost ends of said longitudinally extending side rails, a plurality of edge-to-edge abutting honeycomb-type floor panels positioned between and supported on the horizontally disposed flange portions of said side rails from said foremost interconnecting means to said transversely extending cross member, said floor panels also being provided with upwardly projecting flange means securable directly to the vertically disposed flange portions of said side rails, a plurality of vertical stanchions positioned in longitudinally spaced relation along each of said side rails and across the foremost portions of the vehicle, sheet metal panels connected to said side rails and said vertical stanchions, a plurality of flanged elements interconnecting the top portions of said vertical stanchions, the flanges on said last-mentioned elements defining an uppermost marginal edge circumscribing the topmost portion of said sheet metal panels and said stanchions, corner posts provided at the rearmost corners of said vehicle and supporting said flanged elements, doors carried by said corner posts and swingable in a horizontal position to provide access to the interior of said vehicle, and means comprising a plurality of covering panels disposed in overlapping relationship extending from edge to edge across the top of said vehicle for defining a roof structure whereby said vehicle is closed and rendered weatherproof.

*8. A monocoque type vehicle for transporting cargo comprising in combination a frameless cargo receiving floor structure including longitudinally extending laterally spaced side rails and floor elements disposed therebetween, side panel elements affixed to said side rails, support means on and forming part of said side rails for receiving and supportingly engaging said floor elements, said rails also acting as the principal support means for said floor elements, means securing said floor elements to said support means on said side rails whereby loads imposed on said floor elements are directly transferred to said side rails, the forward portion of said floor structure including means facilitating an articulated connection of the vehicle to a prime mover, and means for removably and slidably securing a rear wheel suspension means to*

*said side rails at selected points located adjacent the areas of supporting engagement of certain of the floor elements by the support means on the side rails whereby said side rails can act as a common load transferring medium for transferring loads initially imposed on the floor elements both to said side panel elements and said rear wheel suspension means.*

*9. A monocoque type vehicle for transporting cargo comprising in combination a frameless cargo receiving floor structure including longitudinally extending laterally spaced side rails and floor elements disposed therebetween, siding panel elements affixed to said side rails, support means on and forming part of said side rails for receiving and supportingly engaging said floor elements, said rails also acting as the principal support means for said floor elements, means securing said floor elements to said support means on said side rails whereby loads imposed on said floor elements are directly transferred to said side rails, and means for removably and adjustably securing a rear wheel suspension means to said side rails at selected points located adjacent the areas of supporting engagement of certain of the floor elements by the support means on the side rails whereby said side rails can act as a common load transferring medium for transferring loads initially imposed on the floor elements both to said side panel elements and said rear wheel suspension means.*

References Cited by the Examiner

The following references, cited by the Examiner, are of record in the patented file of this patent or the original patent.

UNITED STATES PATENTS

| | | | |
|---|---|---|---|
| 2,108,795 | 2/1938 | Budd. | |
| 2,441,106 | 5/1948 | Theriault. | |
| 2,528,818 | 11/1950 | Brown et al. | |
| 2,540,400 | 2/1951 | McHenry | 296—28 |
| 2,606,769 | 8/1952 | De Lay. | |
| 2,682,419 | 6/1954 | Wolf. | |
| 2,744,042 | 5/1956 | Pace. | |
| 2,773,718 | 12/1956 | Bohlen | 296—28 |
| 2,831,700 | 4/1958 | Sheppard et al. | 280—405 X |
| 2,831,735 | 4/1958 | Bennett et al. | 280—405 X |
| 2,835,504 | 5/1958 | Acker. | |
| 2,839,311 | 6/1958 | Locker | 280—405 X |
| 2,841,415 | 7/1958 | Black. | |
| 2,888,297 | 5/1959 | Ridgway | 280—405 X |
| 2,901,283 | 8/1959 | Curell | 296—28 |

OTHER REFERENCES

"Prefabricated Shapes for Magnesium Truck Bodies," in "Automotive Industries" magazine, September 15, 1957, page 81.

BENJAMIN HERSH, *Primary Examiner.*

A. HARRY LEVY, PHILIP ARNOLD, *Examiners.*

E. EARL PORTER, LEO FRIAGLIA, *Assistant Examiners.*